United States Patent
Zhang

(10) Patent No.: US 12,072,780 B2
(45) Date of Patent: Aug. 27, 2024

(54) METHOD AND APPARATUS FOR TESTING AI CHIP COMPUTING PERFORMANCE, AND NON-TRANSITORY COMPUTER-READABLE STORAGE MEDIUM

(71) Applicant: Kunlunxin Technology (Beijing) Company Limited, Beijing (CN)

(72) Inventor: Zhao Zhang, Beijing (CN)

(73) Assignee: Kunlunxin Technology (Beijing) Company Limited, Beijing (CN)

( * ) Notice: Subject to any disclaimer, the term of this patent is extended or adjusted under 35 U.S.C. 154(b) by 129 days.

(21) Appl. No.: 17/808,282

(22) Filed: Jun. 22, 2022

(65) Prior Publication Data

US 2023/0029359 A1  Jan. 26, 2023

(30) Foreign Application Priority Data

Jul. 26, 2021 (CN) .......................... 202110843968.0

(51) Int. Cl.
*G06F 11/273* (2006.01)
*G06F 11/22* (2006.01)
(Continued)

(52) U.S. Cl.
CPC ...... *G06F 11/2733* (2013.01); *G06F 11/2236* (2013.01); *G06F 11/2273* (2013.01); *G06F 11/3409* (2013.01); *G06F 18/214* (2023.01)

(58) Field of Classification Search
CPC ............. G06F 11/2733; G06F 11/2236; G06F 11/2273; G06F 11/3409; G06F 18/214; G06F 11/3013; G06F 11/3457
(Continued)

(56) References Cited

U.S. PATENT DOCUMENTS

2019/0148013 A1* 5/2019 Pulitzer ................. G06N 3/042
　　　　　　　　　　　　　　　　　　　　706/11
2019/0311247 A1* 10/2019 Yang ..................... G06N 3/045
(Continued)

FOREIGN PATENT DOCUMENTS

CN　　　103308846 A　　　9/2013
CN　　　110376503 A　*　10/2019　......... G01R 31/2882
(Continued)

OTHER PUBLICATIONS

First Search Report issued in corresponding CN Application No. 2021108439680, on Nov. 30, 2023, 6 pages.
(Continued)

*Primary Examiner* — Albert Decady
*Assistant Examiner* — Osman M Alshack
(74) *Attorney, Agent, or Firm* — Hunton Andrews Kurth LLP

(57) ABSTRACT

Provided are a method and an apparatus for testing AI chip computing performance, and a non-transitory computer-readable storage medium. The method includes: forming computing performance result data of a to-be-tested AI chip according to a plurality of items of simulation data formed in a development process of the to-be-tested AI chip; acquiring a function instruction set matched with a to-be-tested service function, wherein the function instruction set is composed of a plurality of instructions in a standard instruction set matched with the to-be-tested AI chip; and predicting computing time required by the to-be-tested AI chip to execute the to-be-tested service function according to the function instruction set and the computing performance result data.

17 Claims, 3 Drawing Sheets

(51) Int. Cl.
*G06F 11/34* (2006.01)
*G06F 18/214* (2023.01)

(58) Field of Classification Search
USPC .............................. 714/715, 718, 724, 726
See application file for complete search history.

(56) References Cited

U.S. PATENT DOCUMENTS

| | | | |
|---|---|---|---|
| 2020/0201697 A1* | 6/2020 | Torng | G06F 11/076 |
| 2021/0157966 A1* | 5/2021 | Crowl | G06F 30/373 |
| 2021/0215756 A1* | 7/2021 | Guo | G01R 31/31917 |
| 2021/0217483 A1* | 7/2021 | Guo | G11C 29/12 |
| 2021/0223311 A1* | 7/2021 | Guo | G01R 31/3177 |
| 2021/0295939 A1* | 9/2021 | Palfer-Sollier | G11C 29/1201 |
| 2022/0138586 A1* | 5/2022 | Kim | G06N 3/10 |

FOREIGN PATENT DOCUMENTS

| | | |
|---|---|---|
| CN | 111538646 A | 8/2020 |
| CN | 111781488 A | 10/2020 |
| KR | 20210042854 A | 4/2021 |

OTHER PUBLICATIONS

Office Action issued in corresponding CN Application No. 2021108439680, on Dec. 4, 2023, 8 pages.

* cited by examiner

METHOD AND APPARATUS FOR TESTING AI CHIP COMPUTING PERFORMANCE, AND NON-TRANSITORY COMPUTER-READABLE STORAGE MEDIUM

CROSS-REFERENCE TO RELATED APPLICATION(S)

This application claims priority to Chinese Patent Application No. 202110843968.0 filed with the China National Intellectual Property Administration (CNIPA) on Jul. 26, 2021, the disclosure of which is incorporated herein by reference in its entirety.

TECHNICAL FIELD

The present disclosure relates to the field of computer technologies, in particular, to the technical field of artificial intelligence and deep learning, and specifically, to a method and an apparatus for testing AI chip computing performance, and a non-transitory computer-readable storage medium.

BACKGROUND

In the development process of artificial intelligence (AI) chips, it is necessary to develop a performance simulator corresponding to an AI chip in advance or synchronously. The performance simulator of the AI chip is configured to simulate the performance of the AI chip in the execution of the computing process to achieve that the performance simulation result is approximate to the actual performance result of the AI chip.

At present, the performance simulator of the AI chip is usually a performance simulator obtained by forward development according to the hardware design and implementation mode of the AI chip. However, due to the increasing complexity of the AI chip design, the current development scheme of the performance simulator often requires developers to be equipped with a high professional level, and the developers need to deeply understand the design and implementation mode of AI chips, which consume a lot of development resources and time. In addition, it is difficult to improve the accuracy of simulation results, the flexibility of the simulator is relatively low, and the cost of version iteration is relatively high.

SUMMARY

The present disclosure provides a method and an apparatus for testing AI chip computing performance, and a non-transitory computer-readable storage medium.

According to an aspect of the present disclosure, a method for testing AI chip computing performance is provided. The method includes the steps described below.

Computing performance result data of a to-be-tested AI chip is formed according to a plurality of items of simulation data formed in a development process of the to-be-tested AI chip.

A function instruction set matched with a to-be-tested service function is acquired, where the function instruction set is composed of a plurality of instructions in a standard instruction set matched with the to-be-tested AI chip.

Computing time required by the to-be-tested AI chip to execute the service function is predicted according to the function instruction set and the computing performance result data.

According to another aspect of the present disclosure, an apparatus for testing AI chip computing performance is provided. The apparatus includes at least one processor; and a memory which is in a communication connection with the at least one processor; wherein the memory stores an instruction executable by the at least one processor, and the instruction, when executed by the at least one processor, enables the at least one processor to perform: forming computing performance result data of a to-be-tested AI chip according to a plurality of items of simulation data formed in a development process of the to-be-tested AI chip; acquiring a function instruction set matched with a to-be-tested service function, where the function instruction set is composed of a plurality of instructions in a standard instruction set matched with the to-be-tested AI chip; predicting computing time required by the to-be-tested AI chip to execute the service function according to the function instruction set and the computing performance result data.

According to another aspect of the present disclosure, a non-transitory computer-readable storage medium is provided. The computer instruction is configured to enable a computer to perform: forming computing performance result data of a to-be-tested AI chip according to a plurality of items of simulation data formed in a development process of the to-be-tested AI chip; acquiring a function instruction set matched with a to-be-tested service function, wherein the function instruction set is composed of a plurality of instructions in a standard instruction set matched with the to-be-tested AI chip; and predicting computing time required by the to-be-tested AI chip to execute the to-be-tested service function according to the function instruction set and the computing performance result data.

It is to be understood that the content described in this part is neither intended to identify key or important features of embodiments of the present disclosure nor intended to limit the scope of the present disclosure. Other features of the present disclosure are apparent from the description provided hereinafter.

DETAILED DESCRIPTION

Example embodiments of the present disclosure, including details of the embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
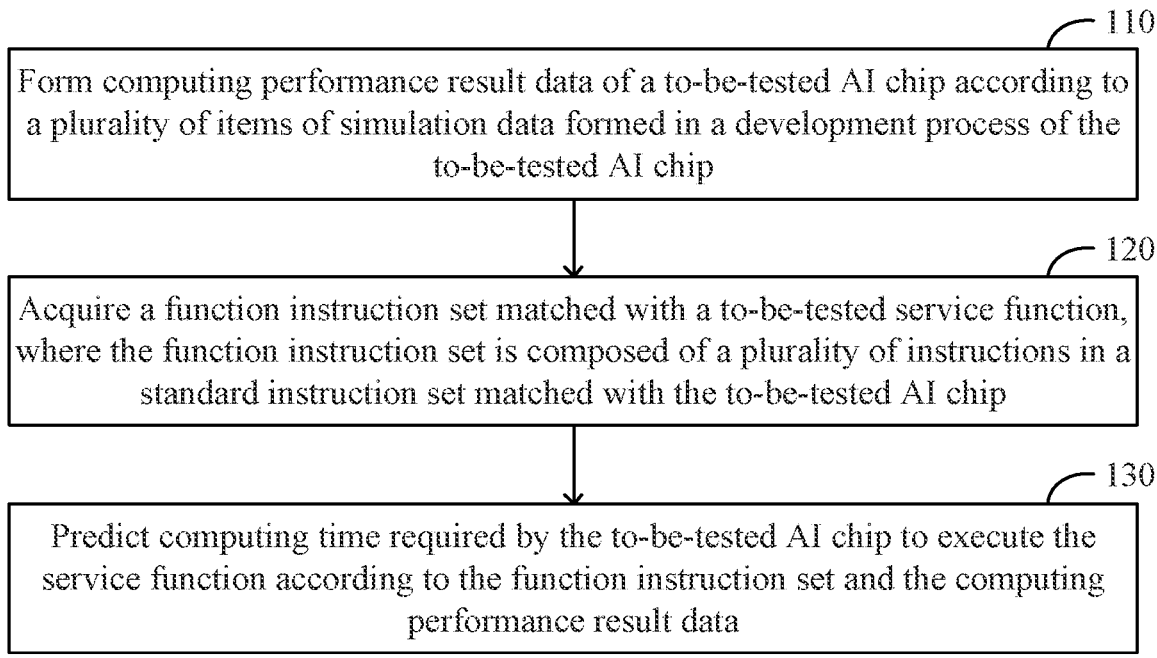
FIG. 1 is a flowchart of a method for testing AI chip computing performance according to an embodiment of the present disclosure.

FIG. 1 is a flowchart of a method for testing AI chip computing performance according to an embodiment of the present disclosure. This embodiment is applicable to the case of predicting the computing performance of an AI chip. The method may be performed by an apparatus for testing AI chip computing performance. The apparatus may be implemented in software and/or hardware and usually integrated in a terminal or a server having a data processing function. Specifically, with reference to FIG. 1, the method includes the steps described below.

In step 110, computing performance result data of a to-be-tested AI chip is formed according to a plurality of items of simulation data formed in a development process of the to-be-tested AI chip.

In this embodiment, the to-be-tested AI chip is an AI chip whose computing performance is to be tested. In the development process of the to-be-tested AI chip, the computing performance of the to-be-tested AI chip may be simulated by a performance simulation tool to obtain a plurality of items of simulation data corresponding to the to-be-tested AI chip. The performance simulation tool may be an electronic design automation (EDA) tool.

In a specific embodiment, the computing result data of the to-be-tested AI chip for different computing instructions and the computing time in the computing process may be simulated through the performance simulation tool to obtain a plurality of items of simulation data corresponding to the to-be-tested AI chip. Each item of simulation data may include computing instructions involved in the simulation process, obtained computing results and computing time.

In an embodiment, after a plurality of items of simulation data formed in the development process of the to-be-tested AI chip is acquired, the computing instructions and the corresponding computing time included in the simulation data may be taken as the computing performance result data of the to-be-tested AI chip.

In step 120, a function instruction set matched with a to-be-tested service function is acquired, where the function instruction set is composed of a plurality of instructions in a standard instruction set matched with the to-be-tested AI chip.

In this step, each to-be-tested AI chip corresponds to one standard instruction set, and the standard instruction set includes a plurality of computing instructions executable by the corresponding to-be-tested AI chip. When the computing performance of an AI chip for a certain service function is predicted, a function instruction set matched with the service function may be acquired. The to-be-tested service function may be a service function that has not been simulated by the performance simulation tool on the to-be-tested AI chip.

In this embodiment, the function instruction set may be composed of a plurality of computing instructions in a standard instruction set matched with the to-be-tested AI chip, and the service function may include an arithmetic operation function and other various operation functions (such as a logical operation).

In step 130, computing time required by the to-be-tested AI chip to execute the service function is predicted according to the function instruction set and the computing performance result data.

In an embodiment, a plurality of computing instructions in the function instruction set may be acquired, computing time corresponding to each computing instruction may be queried in the computing performance result data, and the computing time required by the to-be-tested AI chip to execute the function instruction set (that is, the computing time required by the to-be-tested AI chip to execute the service function) may be predicted according to the computing time corresponding to each computing instruction.

In a specific embodiment, it is assumed that the computing performance result data obtained after the computing performance of the to-be-tested AI chip for each computing instruction is simulated through the performance simulation tool records that the time required by the to-be-tested AI chip to execute a computing instruction A is t1, the time required by the to-be-tested AI chip to execute a computing instruction B is t2, and the time required by the to-be-tested AI chip to execute a computing instruction C is t3. Assuming that the function instruction set matched with the to-be-tested service function includes the computing instruction A, the computing instruction B and the computing instruction C, the computing time required by the to-be-tested AI chip to execute the service function may be predicted according to the relationship between the instructions and the computing time t1, t2 and t3 corresponding to the computing instructions.

In the related art, in the development process of the to-be-tested AI chip, the computing performance of the to-be-tested AI chip for a plurality of computing instructions needs to be simulated through a performance simulation tool to obtain a plurality of items of simulation data. However, these simulation data cannot be exhausted to all computing instruction combinations. The method for testing AI chip computing performance provided by this embodiment may be integrated in a performance simulator of the AI chip, and the computing performance result data obtained after a to-be-tested AI chip is simulated by a simulation tool is acquired to predict performance results corresponding to function instruction sets that have not been simulated by the simulation tool, which in one aspect, can ensure the accuracy of the prediction result of the AI chip performance and in another aspect, can save developers from deeply understanding the design and implementation of the AI chip, thereby greatly reducing the development and debugging workload of the performance simulator, saving the resources and time consumed for developing the performance simulator, reducing the version iteration cost of a performance simulator of an AI chip whose design scheme is frequently changed, and improving the flexibility of the performance simulator.

In the technical scheme of this embodiment of the present disclosure, through the technical means of forming computing performance result data of a to-be-tested AI chip according to a plurality of items of simulation data formed in a development process of the to-be-tested AI chip, acquiring a function instruction set matched with a to-be-tested service function and predicting computing time required by the to-be-tested AI chip to execute the service function according to the function instruction set and the computing performance result data, the accuracy of the prediction result of the AI chip computing performance can be ensured and the development and debugging workload of the performance simulator can be reduced.

Figure 2:
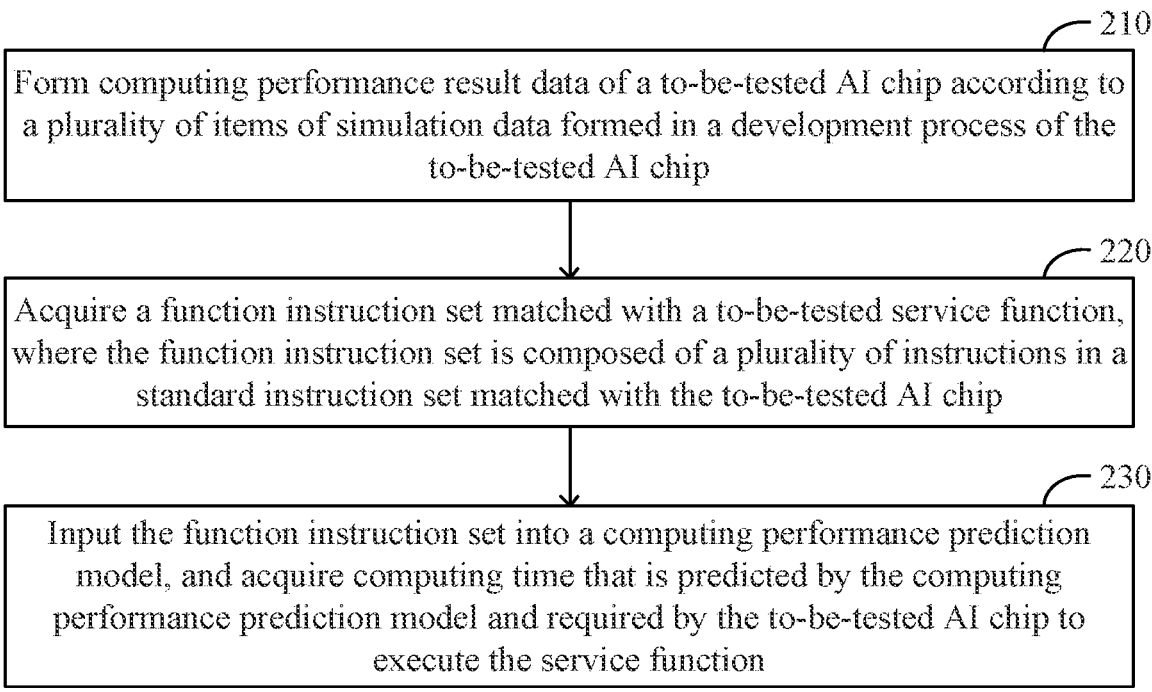
FIG. 2 is a flowchart of another method for testing AI chip computing performance according to an embodiment of the present disclosure.

FIG. 2 is a flowchart of another method for testing AI chip computing performance according to an embodiment of the present disclosure. This embodiment is the further refinement of the preceding technical scheme, and the technical scheme of this embodiment may be combined with one or more of the preceding implementations. Specifically, with reference to FIG. 2, the method includes the steps described below.

In step 210, computing performance result data of a to-be-tested AI chip is formed according to a plurality of items of simulation data formed in a development process of the to-be-tested AI chip.

In an implementation of this embodiment, the step where the computing performance result data of the to-be-tested AI chip is formed according to the plurality of items of simulation data formed in the development process of the to-be-tested AI chip includes at least one of the following steps 211, 212 and 213.

In step 211, computing time corresponding to each standard instruction in the standard instruction set is acquired from the plurality of items of simulation data to form computing performance result data in an instruction dimension.

In this embodiment, the computing performance of the to-be-tested AI chip for each standard instruction may be simulated through a performance simulation tool to obtain simulation data, and then the computing time that corresponds to each standard instruction and is included in the simulation data is taken as the computing performance result data in the instruction dimension.

In step 212, computing time corresponding to each function module is acquired from the simulation data to form computing performance result data in a single function module dimension, where the function module is composed of a plurality of standard instructions.

In this embodiment, the function module may be composed of a plurality of standard instructions for implementing specific computing functions. The computing performance of the to-be-tested AI chip for each function module may be simulated through a performance simulation tool to obtain simulation data, and then the computing time that corresponds to each function module and is included in the simulation data is taken as the computing performance result data in the single function module dimension.

In step 213, computing time corresponding to each function module group is acquired from the simulation data to form computing performance result data in a function module group dimension, where the function module group includes a plurality of function modules and a cooperative operating relationship among the plurality of function modules.

In this embodiment, the function module group includes a plurality of function modules and a cooperative operating relationship among the plurality of function modules, such as a data interaction relationship among the plurality of function modules and an execution sequence relationship (for example, a serial execution relationship or a parallel execution relationship) and the like.

The computing performance of the to-be-tested AI chip for each function module group may be simulated through a performance simulation tool to obtain simulation data, and then the computing time that corresponds to each function module group and is included in the simulation data is taken as the computing performance result data in the function module group dimension.

The advantage of this setting is that the computing performance result data obtained through the simulation can cover as many instruction combinations as possible by simulating the computing performance of the to-be-tested AI chip through the performance simulation tool in different dimensions, thereby improving the accuracy of the subsequent computing performance prediction result and improving the prediction efficiency of the computing performance of the AI chip.

In step 220, a function instruction set matched with a to-be-tested service function is acquired, where the function instruction set is composed of a plurality of instructions in a standard instruction set matched with the to-be-tested AI chip.

In step 230, the function instruction set is inputted into a computing performance prediction model, and computing time that is predicted by the computing performance prediction model and required by the to-be-tested AI chip to execute the service function is acquired, where the computing performance prediction model is trained using the computing performance result data as a training sample.

In this embodiment, a neural network model may be iteratively trained using the computing performance result data to obtain the computing performance prediction model. The neural network model may specifically be a recurrent neural network (RNN) model.

In an embodiment, a first amount of computing performance result data may be used as a training data set and a second amount of computing performance result data may be used as a test data set. The first amount is greater than the second amount. The training data set is used for being inputted into a pre-constructed neural network model, adjusting parameters of the neural network model according to the output result and thus completing the training of the neural network model. The test data set is used for testing the accuracy of the processing result of the trained neural network model and determining whether the trained neural network model can be used as a computing performance prediction model according to the accuracy.

In this embodiment, a performance prediction model is constructed and a function instruction set matched with the to-be-tested service function is inputted into the computing performance prediction model, thereby achieving the automation of the prediction process of the computing performance of the AI chip and improving the prediction efficiency of the computing performance of the AI chip. In addition, the computing performance data obtained by simulation in different dimensions is taken as training samples and the computing performance prediction model is trained using the training samples, thereby improving the accuracy of the prediction result of the AI chip computing performance.

In the technical scheme of this embodiment of the present disclosure, through the technical means of forming computing performance result data of a to-be-tested AI chip according to a plurality of items of simulation data formed in a development process of the to-be-tested AI chip, acquiring a function instruction set matched with a to-be-tested service function, inputting the function instruction set into a computing performance prediction model, and acquiring computing time that is predicted by the computing performance prediction model and required by the to-be-tested AI chip to execute the service function, the accuracy of the prediction result of the AI chip computing performance can be ensured and the development and debugging workload of the performance simulator can be reduced.

Figure 3:
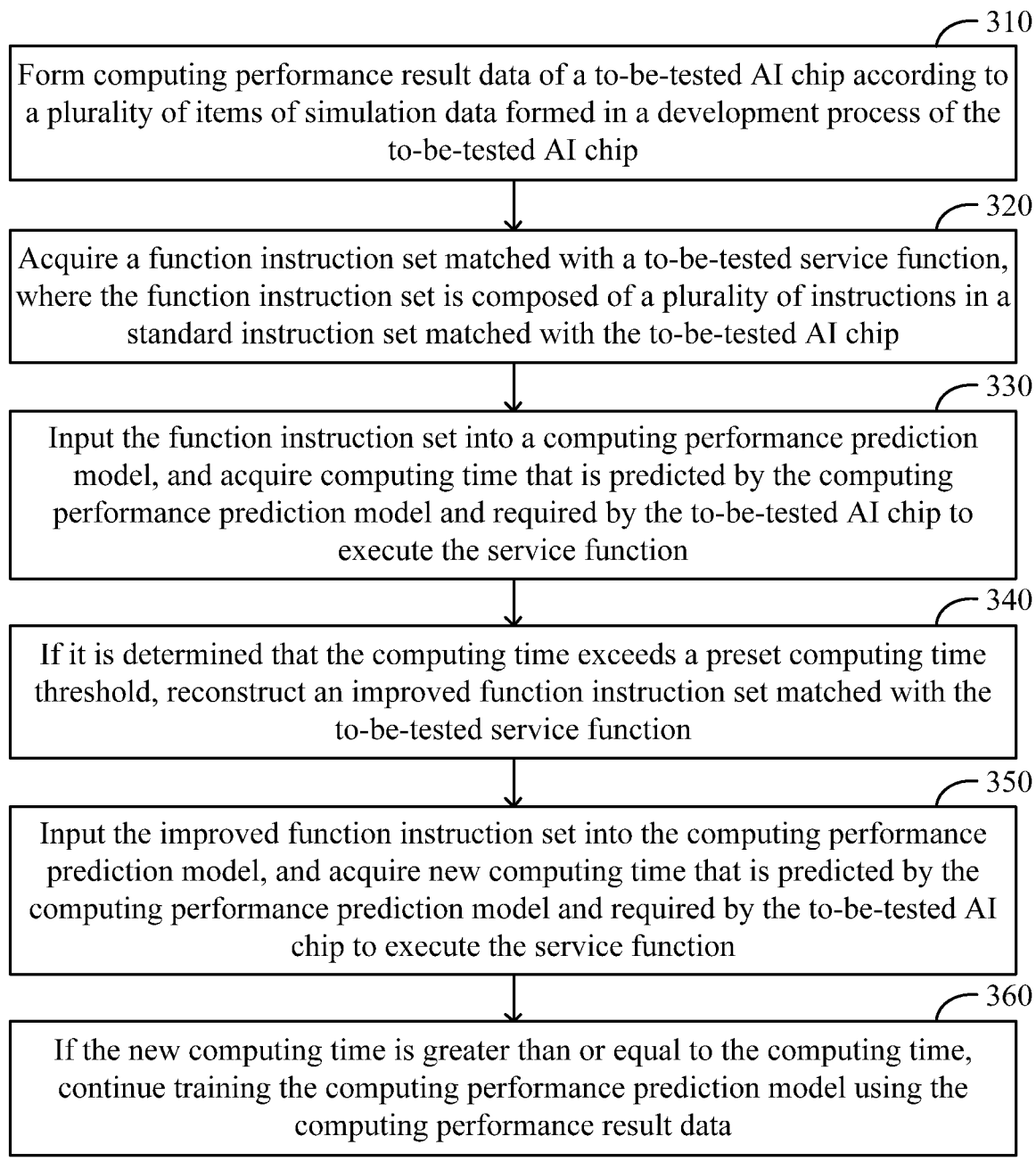
FIG. 3 is a flowchart of another method for testing AI chip computing performance according to an embodiment of the present disclosure.

This embodiment of the present disclosure is the further refinement of the preceding embodiments, and explanations of terms identical to or corresponding to terms in the preceding embodiments are not repeated herein. FIG. 3 is a flowchart of another method for testing AI chip computing performance according to an embodiment of the present disclosure. In this embodiment, the method includes the steps described below.

In step 310, computing performance result data of a to-be-tested AI chip is formed according to a plurality of items of simulation data formed in a development process of the to-be-tested AI chip.

In step 320, a function instruction set matched with a to-be-tested service function is acquired, where the function instruction set is composed of a plurality of instructions in a standard instruction set matched with the to-be-tested AI chip.

In step 330, the function instruction set is inputted into a computing performance prediction model, and computing time that is predicted by the computing performance prediction model and required by the to-be-tested AI chip to execute the service function is acquired.

In an implementation of this embodiment, the computing performance result data further includes an input data set corresponding to a standard instruction, an input data set corresponding to a function module or an input data set corresponding to a function module group.

In this embodiment, when the AI chip executes a specific computing instruction, if the input data corresponding to the computing instruction changes, the computing performance of the AI chip for the computing instruction usually changes accordingly. For example, when the range of the input data corresponding to a computing instruction becomes large, the computing time of the AI chip for the computing instruction usually becomes long.

In order to improve the accuracy of the prediction result of the AI chip computing performance, the computing performance of the to-be-tested AI chip may be simulated in different dimensions in conjunction with the input data set corresponding to each standard instruction, the input data set corresponding to each function module and the input data set corresponding to each function module group to obtain simulation data, and then the computing time and input data set corresponding to each standard instruction, the computing time and input data set corresponding to each function module and the computing time and input data set corresponding to each function module group included in the simulation data are taken as the computing performance result data.

In an implementation, the step where the function instruction set is inputted into the computing performance prediction model, and the computing time that is predicted by the computing performance prediction model and required by the to-be-tested AI chip to execute the service function is acquired includes: the function instruction set and an input data set corresponding to the to-be-tested service function are jointly inputted into the computing performance prediction model, and the computing time that is predicted by the computing performance prediction model and required by the to-be-tested AI chip to execute the service function is acquired.

After the function instruction set and the input data set corresponding to the to-be-tested service function are jointly inputted into the computing performance prediction model, the computing performance prediction model outputs prediction results of the computing time of the to-be-tested AI chip for the function instruction set and the input data set.

The advantage of this setting is that the computing performance of the AI chip for different input data sets in the same computing instruction can be predicted and the accuracy of the prediction result of the AI chip computing performance can be improved.

In another implementation of this embodiment, the computing performance result data further includes system-on-chip (SoC) environment description information corresponding to a standard instruction, SoC environment description information corresponding to a function module or SoC environment description information corresponding to a function module group.

In this embodiment, when the AI chip executes a specific computing instruction, if the SoC environment description information corresponding to the computing instruction changes, the computing performance of the AI chip for the computing instruction usually changes accordingly. The SoC environment description information may be hardware system description information of the AI chip. For example, when the storage speed of the memory of the AI chip corresponding to a computing instruction becomes fast, the computing time of the AI chip for the computing instruction usually becomes short.

In order to improve the accuracy of the prediction result of the AI chip computing performance, the computing performance of the to-be-tested AI chip may be simulated in different dimensions in conjunction with the SoC environment description information corresponding to each standard instruction, the SoC environment description information corresponding to each function module and the SoC environment description information corresponding to each function module group to obtain simulation data, and then the computing time and SoC environment description information corresponding to each standard instruction, the computing time and SoC environment description information corresponding to each function module and the computing time and SoC environment description information corresponding to each function module group included in the simulation data are taken as the computing performance result data.

In an implementation, the step where the function instruction set is inputted into the computing performance prediction model, and the computing time that is predicted by the computing performance prediction model and required by the to-be-tested AI chip to execute the service function is acquired includes: the function instruction set and SoC environment description information corresponding to the to-be-tested service function are jointly inputted into the computing performance prediction model, and the computing time that is predicted by the computing performance prediction model and required by the to-be-tested AI chip to execute the service function is acquired.

After the function instruction set and the SoC environment description information corresponding to the to-be-tested service function are jointly inputted into the computing performance prediction model, the computing performance prediction model outputs prediction results of the computing time of the to-be-tested AI chip for the function instruction set and the SoC environment description information.

The advantage of this setting is that the computing performance of the AI chip for different hardware environments in the same computing instruction can be predicted and the accuracy of the prediction result of the AI chip computing performance can be improved.

In this embodiment, the SoC environment description information includes at least one of: a SoC chip type, a memory type configured on a SoC chip, an access memory configuration type configured on a SoC chip, or a bandwidth of a SoC chip.

In a specific embodiment, the SoC chip type may include a graphics processing unit (GPU), a field-programmable gate array (FPGA), an application-specific integrated circuit (ASIC), and the like. The memory type configured on a SoC chip may include a read-only memory, a random read-andwrite memory, and the like. The access memory configuration type configured on a SoC chip may include allowing access to memory, prohibiting access to memory, and the like.

The advantage of this setting is that the computing performance result data obtained through the simulation can cover as much SoC environment description information as possible, thereby improving the accuracy of the subsequent computing performance prediction result and improving the prediction efficiency of the AI chip computing performance.

In step 340, if it is determined that the computing time exceeds a preset computing time threshold, an improved function instruction set matched with the to-be-tested service function is reconstructed, where AI chip computing performance under the improved function instruction set is superior to AI chip computing performance under the function instruction set.

In this embodiment, if the computing time that is outputted by the computing performance prediction model and required by the to-be-tested AI chip to execute the service function exceeds the preset computing time threshold, it may be considered that the efficiency of the to-be-tested AI chip to execute the service function is low. At this point, in order to improve the efficiency of the to-be-tested AI chip to execute the service function, the function instruction set matched with the to-be-tested service function may be improved to obtain the improved function instruction set.

In a specific embodiment, a plurality of instructions included in the function instruction set matched with the to-be-tested service function may be simplified or the computing mode involved in each instruction may be optimized, to improve the efficiency of the to-be-tested AI chip to execute the service function.

In step 350, the improved function instruction set is inputted into the computing performance prediction model, and new computing time that is predicted by the computing performance prediction model and required by the to-be-tested AI chip to execute the service function is acquired.

In step 360, if the new computing time is greater than or equal to the computing time, the computing performance prediction model is continuously trained using the computing performance result data.

In this embodiment, after the function instruction set matched with the to-be-tested service function is improved, if the new computing time outputted by the computing performance prediction model is greater than or equal to the computing time before the improvement, it may be considered that the prediction result of the performance prediction model is inaccurate. At this point, the computing performance result data may be continuously inputted to the performance prediction model, and then the parameters of the model are adjusted according to the output result of the performance prediction model until the prediction result of the performance prediction model is accurate.

The advantage of this setting is that the accuracy of the prediction result of the AI chip computing performance can be improved by continuing training the computing performance prediction model.

In this embodiment of the present disclosure, through the technical means of forming computing performance result data of a to-be-tested AI chip according to a plurality of items of simulation data formed in a development process of the to-be-tested AI chip, acquiring a function instruction set matched with a to-be-tested service function, inputting the function instruction set into a computing performance prediction model, acquiring computing time that is predicted by the computing performance prediction model and required by the to-be-tested AI chip to execute the service function, reconstructing an improved function instruction set matched with the to-be-tested service function in response to determining that the computing time exceeds a preset computing time threshold, inputting the improved function instruction set into the computing performance prediction model, acquiring new computing time that is predicted by the computing performance prediction model and required by the to-be-tested AI chip to execute the service function, and continuing training the computing performance prediction model using the computing performance result data in response to determining that the new computing time is greater than or equal to the computing time, the accuracy of the prediction result of the AI chip computing performance can be ensured and the development and debugging workload of the performance simulator can be reduced.

It is to be noted that in the technical schemes of the present disclosure, acquisition, storage and application of user personal information involved herein are in compliance with relevant laws and regulations and do not violate the public order and good customs.

An embodiment of the present disclosure further provides an apparatus for testing AI chip computing performance, and the apparatus is configured to execute the method for testing AI chip computing performance described above.

Figure 4:
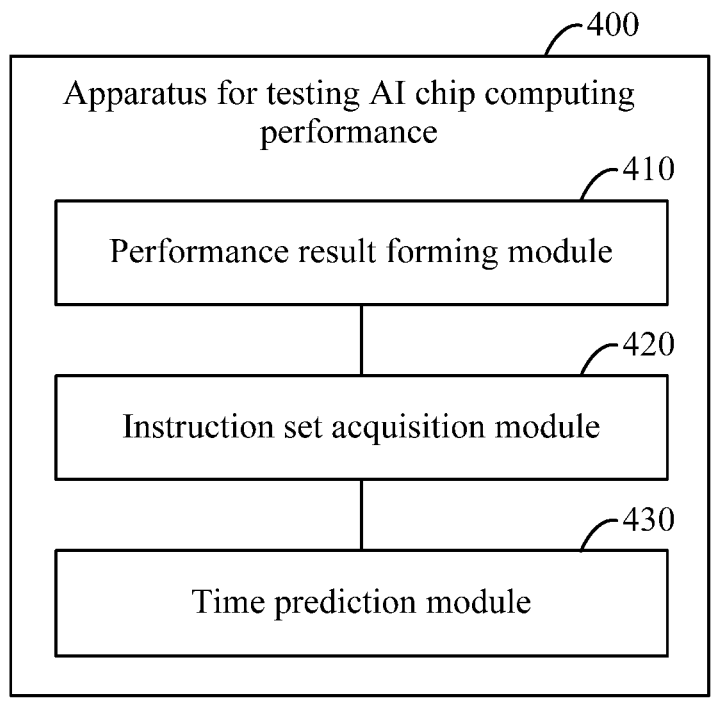
FIG. 4 is a structural schematic diagram of an apparatus for testing AI chip computing performance according to an embodiment of the present disclosure.

FIG. 4 is a structural schematic diagram of an apparatus 400 for testing AI chip computing performance according to an embodiment of the present disclosure. The apparatus includes a performance result forming module 410, an instruction set acquisition module 420, and a time prediction module 430.

The performance result forming module 410 is configured to form computing performance result data of a to-be-tested AI chip according to a plurality of items of simulation data formed in a development process of the to-be-tested AI chip.

The instruction set acquisition module 420 is configured to acquire a function instruction set matched with a to-be-tested service function, where the function instruction set is composed of a plurality of instructions in a standard instruction set matched with the to-be-tested AI chip.

The time prediction module 430 is configured to predict computing time required by the to-be-tested AI chip to execute the service function according to the function instruction set and the computing performance result data.

In the technical scheme of this embodiment of the present disclosure, through the technical means of forming computing performance result data of a to-be-tested AI chip according to a plurality of items of simulation data formed in a development process of the to-be-tested AI chip, acquiring a function instruction set matched with a to-be-tested service function and predicting computing time required by the to-be-tested AI chip to execute the service function according to the function instruction set and the computing performance result data, the accuracy of the prediction result of the AI chip computing performance can be ensured and the development and debugging workload of the performance simulator can be reduced.

Based on the embodiments described above, the performance result forming module 410 includes a first result forming unit, a second result forming unit, and a third result forming unit.

The first result forming unit is configured to acquire from the plurality of items of simulation data computing time corresponding to each standard instruction in the standard instruction set to form computing performance result data in an instruction dimension.

The second result forming unit is configured to acquire from the plurality of items of simulation data computing time corresponding to each function module to form computing performance result data in a single function module dimension, where the function module is composed of a plurality of standard instructions.

The third result forming unit is configured to acquire from the plurality of items of simulation data computing time corresponding to each function module group to form computing performance result data in a function module group dimension, where the function module group includes a plurality of function modules and a cooperative operating relationship among the plurality of function modules.

The time prediction module 430 includes a model input unit.

The model input unit is configured to input the function instruction set into a computing performance prediction model, and acquire computing time that is predicted by the computing performance prediction model and required by the to-be-tested AI chip to execute the service function.

The computing performance prediction model is trained using the computing performance result data as a training sample.

The computing performance result data further includes an input data set corresponding to a standard instruction, an input data set corresponding to a function module or an input data set corresponding to a function module group.

The model input unit includes a data set input sub-unit.

The data set input sub-unit is configured to jointly input the function instruction set and an input data set corresponding to the to-be-tested service function into the computing performance prediction model, and acquire the computing time that is predicted by the computing performance prediction model and required by the to-be-tested AI chip to execute the service function.

The computing performance result data further includes SoC environment description information corresponding to a standard instruction, SoC environment description information corresponding to a function module or SoC environment description information corresponding to a function module group.

The model input unit further includes a description information input sub-unit.

The description information input sub-unit is configured to jointly input the function instruction set and SoC environment description information corresponding to the to-be-tested service function into the computing performance prediction model, and acquire the computing time that is predicted by the computing performance prediction model and required by the to-be-tested AI chip to execute the service function.

The SoC environment description information includes at least one of: a SoC chip type, a memory type configured on a SoC chip, an access memory configuration type configured on a SoC chip, or a bandwidth of a SoC chip.

The apparatus further includes an instruction set improvement module, an instruction set input module, and a model training module.

The instruction set improvement module is configured to, if it is determined that the computing time exceeds a preset computing time threshold, reconstruct an improved function instruction set matched with the to-be-tested service function, where AI chip computing performance under the improved function instruction set is superior to AI chip computing performance under the function instruction set.

The instruction set input module is configured to input the improved function instruction set into the computing performance prediction model, and acquire new computing time that is predicted by the computing performance prediction model and required by the to-be-tested AI chip to execute the service function.

The model training module is configured to, if the new computing time is greater than or equal to the computing time, continue training the computing performance prediction model using the computing performance result data.

The apparatus for testing AI chip computing performance provided by this embodiment of the present disclosure can perform the method for testing AI chip computing performance provided by any embodiment of the present disclosure and has functional modules and beneficial effects corresponding to the performed method.

According to an embodiment of the present disclosure, the present disclosure further provides an electronic device, a readable storage medium and a computer program product.

Figure 5:
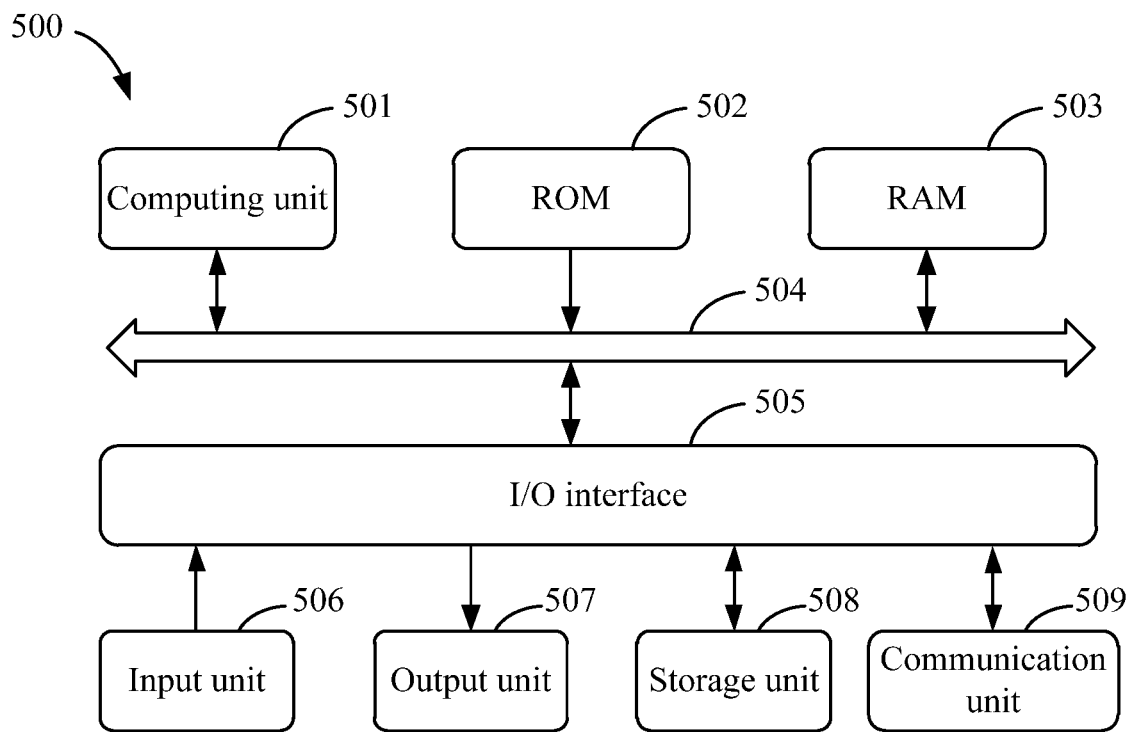
FIG. 5 is a block diagram of an electronic device for performing a method for testing AI chip computing performance according to an embodiment of the present disclosure.

FIG. 5 is a block diagram of an example electronic device 500 for implementing the embodiments of the present disclosure. The electronic device is intended to represent various forms of digital computer, for example, a laptop computer, a desktop computer, a worktable, a personal digital assistant, a server, a blade server, a mainframe computer or another applicable computer. The electronic device may also represent various forms of mobile device, for example, a personal digital assistant, a cellphone, a smartphone, a wearable device or another similar computing device. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may perform various types of appropriate operations and processing based on a computer program stored in a read-only memory (ROM) 502 or a computer program loaded from a storage unit 508 to a random-access memory (RAM) 503. Various programs and data required for operations of the device 500 may also be stored in the RAM 503. The computing unit 501, the ROM 502 and the RAM 503 are connected to each other via a bus 504. An input/output (I/O) interface 505 is also connected to the bus 504.

Multiple components in the device 500 are connected to the I/O interface 505. The multiple components include an input unit 506 such as a keyboard and a mouse, an output unit 507 such as various types of displays and speakers, the storage unit 508 such as a magnetic disk and an optical disk, and a communication unit 509 such as a network card, a modem and a wireless communication transceiver. The communication unit 509 allows the device 500 to exchange information/data with other devices over a computer network such as the Internet and/or various telecommunications networks.

The computing unit 501 may be various general-purpose and/or special-purpose processing components having processing and computing capabilities. Some examples of the computing unit 501 include, but are not limited to, central processing units (CPUs), graphics processing units (GPUs), various special-purpose artificial intelligence (AI) computing chips, various computing units running machine learning models and algorithms, digital signal processors (DSPs) and any suitable processors, controllers and microcontrollers. The computing unit 501 performs various methods and processing described above, such as the method for testing AI chip computing performance. For example, in some embodiments, the method for testing AI chip computing performance may be implemented as a computer software program tangibly contained in a machine-readable medium such as the storage unit 508. In some embodiments, part or all of a computer program may be loaded and/or installed on the device 500 via the ROM 502 and/or the communication unit 509. When the computer programs are loaded into the RAM 503 and executed by the computing unit 501, one or more steps of the method for testing AI chip computing performance described above may be performed.

Alternatively, in other embodiments, the computing unit 501 may be configured, in any other appropriate manner (for example, by means of firmware), to perform the method for testing AI chip computing performance.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems of systems on an AI chip (SoCs), complex programmable logic devices (CPLDs), computer hardware, firmware, software and/or combinations thereof. The embodiments may include implementations in one or more computer programs. The one or more computer programs are executable, interpretable, or executable and interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

Program codes for implementing the methods of the present disclosure may be compiled in any combination of one or more programming languages. These program codes may be provided for a processor or controller of a general-purpose computer, a special-purpose computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or used in conjunction with a system, apparatus or device that executes instructions. The machine-readable medium may be a machine-readable signal medium or a machine-readable storage medium. The machine-readable medium may include, but is not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order to provide the interaction with a user, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user can be sensory feedback in any form (for example, visual feedback, auditory feedback or haptic feedback). Moreover, input from the user can be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship with each other. The server may be a cloud server, also referred to as a cloud computing server or a cloud host. As a host product in a cloud computing service system, the server solves the defects of difficult management and weak service scalability in the service of a related physical host and a related virtual private server (VPS).

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure is within the scope of the present disclosure.

What is claimed is:

1. A method for testing artificial intelligence (AI) chip computing performance, comprising:
    forming computing performance result data of a to-be-tested AI chip according to a plurality of items of simulation data formed in a development process of the to-be-tested AI chip;
    acquiring a function instruction set matched with a to-be-tested service function, wherein the function instruction set is composed of a plurality of instructions in a standard instruction set matched with the to-be-tested AI chip; and predicting computing time required by the to-be-tested AI chip to execute the to-be-tested service function according to the function instruction set and the computing performance result data, wherein forming the computing performance result data of the to-be-tested AI chip according to the plurality of items of simulation data formed in the development process of the to-be-tested AI chip comprises at least one of:

acquiring from the plurality of items of simulation data computing time corresponding to each standard instruction in the standard instruction set to form computing performance result data in an instruction dimension;

acquiring from the plurality of items of simulation data computing time corresponding to each function module to form computing performance result data in a single function module dimension, wherein each function module is composed of a plurality of standard instructions;

and acquiring from the plurality of items of simulation data computing time corresponding to each function module group to form computing performance result data in a function module group dimension, wherein each function module group comprises a plurality of function modules and a cooperative operating relationship among the plurality of function modules.

2. The method according to claim 1, wherein predicting the computing time required by the to-be-tested AI chip to execute the to-be-tested service function according to the function instruction set and the computing performance result data comprises:

inputting the function instruction set into a computing performance prediction model, and acquiring computing time that is predicted by the computing performance prediction model and required by the to-be-tested AI chip to execute the to-be-tested service function; wherein the computing performance prediction model is trained using the computing performance result data as a training sample.

3. The method according to claim 2, wherein the computing performance result data further comprises an input data set corresponding to a standard instruction, an input data set corresponding to a function module or an input data set corresponding to a function module group; and wherein inputting the function instruction set into the computing performance prediction model, and acquiring the computing time that is predicted by the computing performance prediction model and required by the to-be-tested AI chip to execute the to-be-tested service function comprises:

jointly inputting the function instruction set and an input data set corresponding to the to-be-tested service function into the computing performance prediction model, and acquiring the computing time that is predicted by the computing performance prediction model and required by the to-be-tested AI chip to execute the to-be-tested service function.

4. The method according to claim 2, wherein the computing performance result data further comprises system-on-chip (SoC) environment description information corresponding to a standard instruction, SoC environment description information corresponding to a function module or SoC environment description information corresponding to a function module group; and wherein inputting the function instruction set into the computing performance prediction model, and acquiring the computing time that is predicted by the computing performance prediction model and required by the to-be-tested AI chip to execute the to-be-tested service function comprises: jointly inputting the function instruction set and SoC environment description information corresponding to the to-be-tested service function into the computing performance prediction model, and acquiring the computing time that is predicted by the computing performance prediction model and required by the to-be-tested AI chip to execute the to-be-tested service function.

5. The method according to claim 4, wherein the SoC environment description information comprises at least one of: a SoC chip type, a memory type configured on a SoC chip, an access memory configuration type configured on a SoC chip, or a bandwidth of a SoC chip.

6. The method according to claim 2, after predicting the computing time required by the to-be-tested AI chip to execute the to-be-tested service function according to the function instruction set and the computing performance result data, further comprising: in response to determining that the computing time exceeds a preset computing time threshold, reconstructing an improved function instruction set matched with the to-be-tested service function, wherein AI chip computing performance under the improved function instruction set is superior to AI chip computing performance under the function instruction set; inputting the improved function instruction set into the computing performance prediction model, and acquiring new computing time that is predicted by the computing performance prediction model and required by the to-be-tested AI chip to execute the to-be-tested service function; and in response to determining that the new computing time is greater than or equal to the computing time, continuing training the computing performance prediction model using the computing performance result data.

7. An apparatus for testing artificial intelligence (AI) chip computing performance, comprising: at least one processor; and a memory which is in a communication connection with the at least one processor; wherein the memory stores an instruction executable by the at least one processor, and the instruction, when executed by the at least one processor, enables the at least one processor to perform: forming computing performance result data of a to-be-tested AI chip according to a plurality of items of simulation data formed in a development process of the to-be-tested AI chip;

acquiring a function instruction set matched with a to-be-tested service function, wherein the function instruction set is composed of a plurality of instructions in a standard instruction set matched with the to-be-tested AI chip; and predicting computing time required by the to-be-tested AI chip to execute the to-be-tested service function according to the function instruction set and the computing performance result data;

wherein the instruction, when executed by the at least one processor, enables the at least one processor to perform forming the computing performance result data of the to-be-tested AI chip according to the plurality of items of simulation data formed in the development process of the to-be-tested AI chip in at least one of the following ways:

acquiring from the plurality of items of simulation data computing time corresponding to each standard instruction in the standard instruction set to form computing performance result data in an instruction dimension;

acquiring from the plurality of items of simulation data computing time corresponding to each function module to form computing performance result data in a single function module dimension, wherein each function module is composed of a plurality of standard instructions; and acquiring from the plurality of items of simulation data computing time corresponding to each function module group to form computing performance result data in a function module group dimension, wherein each function module group comprises a plurality of function modules and a cooperative operating relationship among the plurality of function modules.

8. The apparatus according to claim 7, wherein the instruction, when executed by the at least one processor, enables the at least one processor to perform predicting the computing time required by the to-be-tested AI chip to execute the to-be-tested service function according to the function instruction set and the computing performance result data in the following way:

inputting the function instruction set into a computing performance prediction model, and acquiring computing time that is predicted by the computing performance prediction model and required by the to-be-tested AI chip to execute the to-be-tested service function; wherein the computing performance prediction model is trained using the computing performance result data as a training sample.

9. The apparatus according to claim 8, wherein the computing performance result data further comprises an input data set corresponding to a standard instruction, an input data set corresponding to a function module or an input data set corresponding to a function module group; and wherein the instruction, when executed by the at least one processor, enables the at least one processor to perform inputting the function instruction set into the computing performance prediction model, and acquiring the computing time that is predicted by the computing performance prediction model and required by the to-be-tested AI chip to execute the to-be-tested service function in the following way: jointly inputting the function instruction set and an input data set corresponding to the to-be-tested service function into the computing performance prediction model, and acquiring the computing time that is predicted by the computing performance prediction model and required by the to-be-tested AI chip to execute the to-be-tested service function.

10. The apparatus according to claim 8, wherein the computing performance result data further comprises system-on-chip (SoC) environment description information corresponding to a standard instruction, SoC environment description information corresponding to a function module or SoC environment description information corresponding to a function module group; and wherein the instruction, when executed by the at least one processor, enables the at least one processor to perform inputting the function instruction set into the computing performance prediction model, and acquiring the computing time that is predicted by the computing performance prediction model and required by the to-be-tested AI chip to execute the to-be-tested service function in the following way:

jointly inputting the function instruction set and SoC environment description information corresponding to the to-be-tested service function into the computing performance prediction model, and acquiring the computing time that is predicted by the computing performance prediction model and required by the to-be-tested AI chip to execute the to-be-tested service function.

11. The apparatus according to claim 10, wherein the SoC environment description information comprises at least one of: a SoC chip type, a memory type configured on a SoC chip, an access memory configuration type configured on a SoC chip, or a bandwidth of a SoC chip.

12. The apparatus according to claim 8, wherein the instruction, when executed by the at least one processor, enables the at least one processor to further perform:

in response to determining that the computing time exceeds a preset computing time threshold, reconstructing an improved function instruction set matched with the to-be-tested service function, wherein AI chip computing performance under the improved function instruction set is superior to AI chip computing performance under the function instruction set; inputting the improved function instruction set into the computing performance prediction model, and acquiring new computing time that is predicted by the computing performance prediction model and required by the to-be-tested AI chip to execute the to-be-tested service function; and in response to determining that the new computing time is greater than or equal to the computing time, continuing training the computing performance prediction model using the computing performance result data.

13. A non-transitory computer-readable storage medium storing a computer instruction, wherein the computer instruction is configured to enable a computer to perform:

forming computing performance result data of a to-be-tested AI chip according to a plurality of items of simulation data formed in a development process of the to-be-tested AI chip;

acquiring a function instruction set matched with a to-be-tested service function, wherein the function instruction set is composed of a plurality of instructions in a standard instruction set matched with the to-be-tested AI chip; and predicting computing time required by the to-be-tested AI chip to execute the to-be-tested service function according to the function instruction set and the computing performance result data;

wherein the computer instruction is configured to enable the computer to perform forming the computing performance result data of the to-be-tested AI chip according to the plurality of items of simulation data formed in the development process of the to-be-tested AI chip in at least one of the following ways:

acquiring from the plurality of items of simulation data computing time corresponding to each standard instruction in the standard instruction set to form computing performance result data in an instruction dimension;

acquiring from the plurality of items of simulation data computing time corresponding to each function module to form computing performance result data in a single function module dimension, wherein each function module is composed of a plurality of standard instructions; and acquiring from the plurality of items of simulation data computing time corresponding to each function module group to form computing performance result data in a function module group dimension, wherein each function module group comprises a plurality of function modules and a cooperative operating relationship among the plurality of function modules.

14. The non-transitory computer-readable storage medium according to claim 13, wherein the computer instruction is configured to enable the computer to perform predicting the computing time required by the to-be-tested AI chip to execute the to-be-tested service function according to the function instruction set and the computing performance result data in the following way:
inputting the function instruction set into a computing performance prediction model, and acquiring computing time that is predicted by the computing performance prediction model and required by the to-be-tested AI chip to execute the to-be-tested service function;
wherein the computing performance prediction model is trained using the computing performance result data as a training sample.

15. The non-transitory computer-readable storage medium according to claim 14, wherein the computing performance result data further comprises an input data set corresponding to a standard instruction, an input data set corresponding to a function module or an input data set corresponding to a function module group; and
wherein the computer instruction is configured to enable the computer to perform inputting the function instruction set into the computing performance prediction model, and acquiring the computing time that is predicted by the computing performance prediction model and required by the to-be-tested AI chip to execute the to-be-tested service function in the following way: jointly inputting the function instruction set and an input data set corresponding to the to-be-tested service function into the computing performance prediction model, and acquiring the computing time that is predicted by the computing performance prediction model and required by the to-be-tested AI chip to execute the to-be-tested service function.

16. The non-transitory computer-readable storage medium according to claim 14, wherein the computing performance result data further comprises system-on-chip (SoC) environment description information corresponding to a standard instruction, SoC environment description information corresponding to a function module or SoC environment description information corresponding to a function module group; and
wherein the computer instruction is configured to enable the computer to perform inputting the function instruction set into the computing performance prediction model, and acquiring the computing time that is predicted by the computing performance prediction model and required by the to-be-tested AI chip to execute the to-be-tested service function in the following way: jointly inputting the function instruction set and SoC environment description information corresponding to the to-be-tested service function into the computing performance prediction model, and acquiring the computing time that is predicted by the computing performance prediction model and required by the to-be-tested AI chip to execute the to-be-tested service function.

17. The non-transitory computer-readable storage medium according to claim 16, wherein the SoC environment description information comprises at least one of: a SoC chip type, a memory type configured on a SoC chip, an access memory configuration type configured on a SoC chip, or a bandwidth of a SoC chip.

* * * * *